UNITED STATES PATENT OFFICE.

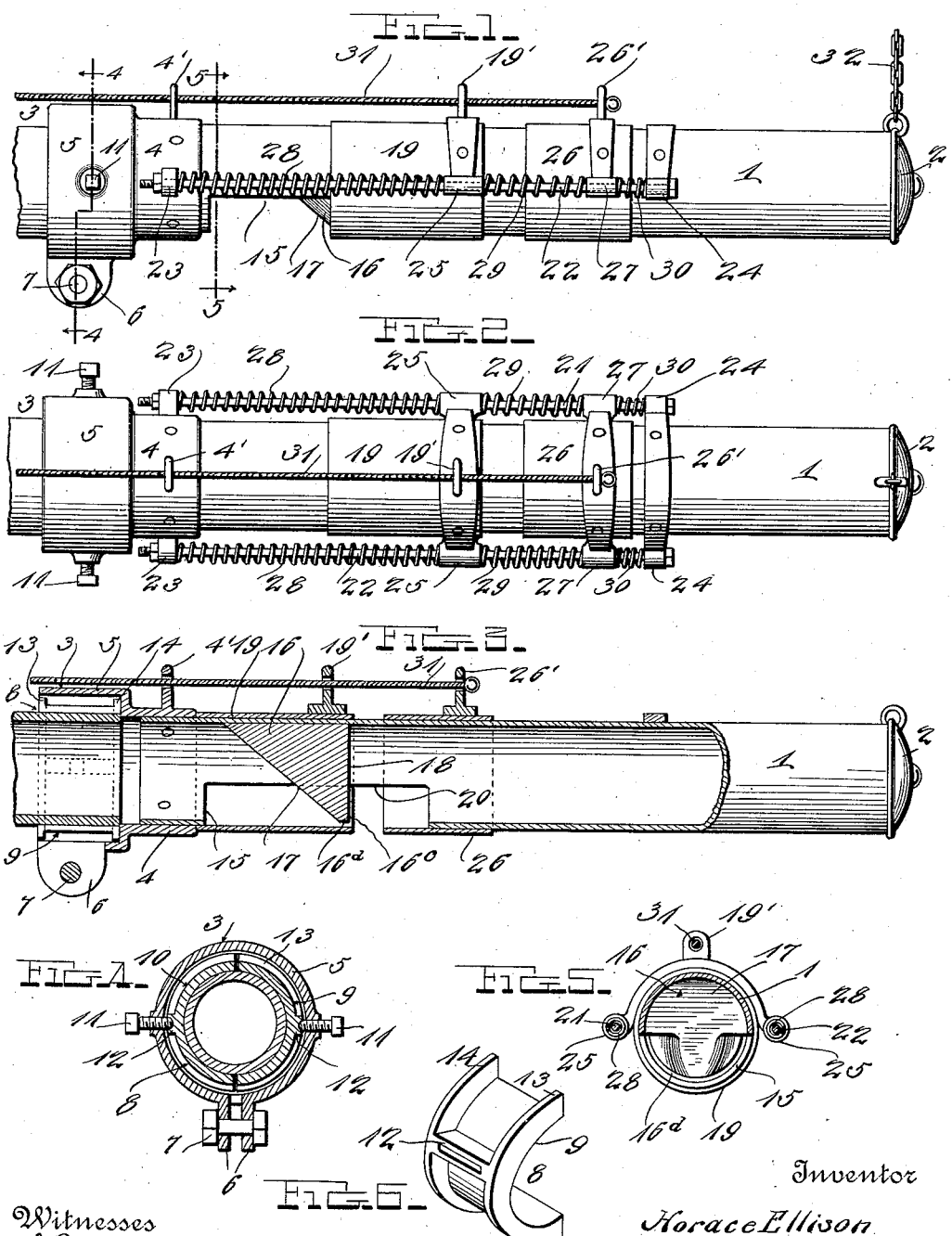

HORACE ELLISON, OF LYNN, MASSACHUSETTS.

WHISTLE.

1,056,782. Specification of Letters Patent. Patented Mar. 25, 1913.

Application filed April 15, 1912. Serial No. 690,813.

*To all whom it may concern:*

Be it known that I, HORACE ELLISON, a citizen of the United States, residing at Lynn, in the county of Essex and State of Massachusetts, have invented certain new and useful Improvements in Whistles; and I do declare the following to be a full, clear, and exact description of the invention, such as will enable others skilled in the art to which it appertains to make and use the same.

This invention relates to an improved whistle for use on locomotives, automobiles, boats and similar vehicles.

The main object of the invention is to provide simple and efficient means under the control of the operator for varying the tone of the whistle, and automatic means for returning the parts to normal position.

Another object of the invention is to provide removable interchangeable means for connecting the whistle with steam pipes of varying diameters.

With these and other objects in view, the invention consists of certain novel features of construction, and the combination and arrangement of parts as will be more fully described and claimed.

In the accompanying drawings: Figure 1 is a side elevation of a steam whistle constructed in accordance with this invention; Fig. 2 is a top plan view thereof; Fig. 3 is a side elevation partly in longitudinal section; Fig. 4 is a transverse vertical section taken on the line 4—4 of Fig. 1; Fig. 5 is a similar view taken on the line 5—5 of Fig. 1; Fig. 6 is a detail perspective view of one of the removable coupling members.

In the embodiment illustrated the whistle comprises a tubular member 1 having a closure 2 at its outer end and a coupling member 3 at its inner end designed for connecting the whistle with a steam, air or other pipe for supplying the operating medium thereto.

The coupling 3 is preferably constructed in the form of a sleeve 4 which fits closely around the inner end of the tube 1, and is secured thereto by riveting or in any other suitable manner. This sleeve merges at its inner end into an enlarged split ring 5 offset from the inner end of the sleeve and having apertured laterally extending lugs or ears 6 at its free ends through which a connecting bolt 7 passes, said bolt being designed to draw the ends of the ring 5 together for clamping the coupling to a pipe or to an inner removable coupling member 8 now to be described. This inner removable coupling 8 is preferably constructed of two semi-cylindrical members 9 and 10 designed to fit within the split ring 5 and be securely clamped therein by means of the bolt 7 and also by auxiliary fastening screws 11, which pass through diametrically opposite sides of the split ring and are adapted to engage grooved ribs 12 formed intermediately of the ends of each of the cylindrical members 9 and 10. These members 9 and 10 are provided with outwardly extending lateral flanges 13 and 14 at their opposite ends, and the ribs 12 extend between and connect said flanges, preferably at a point midway the ends of the members. A plurality of these inner coupling members may be used in connection with the ring 5, the external diameters of said inner members being uniformly the same to adapt them to fit within said ring, and their internal diameters being made larger or smaller, according to the steam pipe of the engine to which they are to be applied. For instance; when a customer orders a whistle he supplies the manufacturer with the size of the exhaust steam pipe or other operating medium supplying the pipe to which the whistle is to be applied, and the manufacturer supplies him with a whistle having an inner coupling of a size to fit said pipe, which may be readily secured within the outer coupling member formed by the split ring 5. Hence it will be obvious that to adapt the whistle for pipes of varying sizes it is only necessary to supply an inner coupling member 8 to fit the pipe to which the whistle is to be applied, without any change being made in the structure of the whistle. This tubular member 1 has an opening 15 formed therein intermediately of its ends, preferably near the inner end, on which the coupling is mounted. This opening is shown formed by cutting out a portion of the tube for about one-half of its diameter and of any suitable or desired length. This opening 15 is closed at its upper end by a solid or hollow plug 16 having a beveled inner face 17 and its outer end 18 is straight and flat, for a purpose to be described. The beveled face 17 is preferably arranged at an angle of 45° and is designed to direct the operating medium into the tube beyond the plug between the side walls of said plug and the inner face of a sleeve 19, to be described. This opening 15 is designed to permit the passage of the exhaust steam from the engine to the atmosphere when the whistle is not in operation. An opening 20 is formed in said tube above the flat face of the plug 17, and it may be of any suitable or desired size, and is normally closed by the sleeve 19 when the whistle is not in operation. Two guide rods 21 and 22 are mounted at diametrically opposite points on opposite sides of the openings 15 and 20 in the tube, the inner ends of said rods being here shown secured in laterally extending lugs as 23 projecting from the opposite sides of the sleeve 4, and the outer ends in lugs 24 extending from opposite sides of the tube 1 at points spaced above the opening 20, said lugs 23 and 24 being arranged in longitudinal alinement. These rods also extend through oppositely disposed apertured lugs or collars 25 secured to opposite sides of the sleeve 19 in longitudinal alinement with the lugs 23 and 24 for a purpose to be described. A sleeve 26 is also slidably mounted on the tube 1 above the sleeve 19 and is provided at diametrically opposite sides with guide sleeves or collars 27 through which the rods 21 and 22 also pass and on which said sleeve 26 is guided.

Coiled wire springs 28 surround the rods 21 and 22 between the lugs 23 and the collars 25 on the sleeve 19, and similar springs 29 of greater strength than the springs 28 are mounted on said rods between the collars of the sleeves 19 and 26, for a purpose to be described. Cushioning springs 30 surround the rods 21 and 22 beyond the lugs or collars 27 on the sleeve 26 and are adapted to be compressed between said collars and the lugs 24 on the tube 1 when said sleeve 26 is at its extreme outward position, into which position it is forced by the springs 28 and 29 when the whistle is not in operation.

The fixed sleeve 4 and the sliding sleeves 19 and 26 have laterally extending apertured ears 4', 19' and 26' fixed thereto at points midway between the collars and lugs through which the guide rods pass, and these ears are disposed in longitudinal alinement and are adapted to receive an operating element, preferably in the form of a cable 31 which is fixed to the ear 26' of the sleeve 26 and passes loosely through the ears 19' and 4', respectively, being secured at its opposite end to a hand or foot lever (not shown), disposed in convenient position for operation by the operator of the vehicle to which the whistle is applied.

The parts of the whistle are normally in the position shown in Fig. 1, with the opening 15 exposed to permit the free passage of the exhaust steam from the engine. When it is desired to sound the whistle a pull is exerted on the cable 31 which moves the sleeves 19 and 26 inward against the tension of the spring 28 and 29. The sleeve 19 responds more quickly to the pull exerted than the sleeve 26 because of the greater strength of the springs 29 which support the sleeve 26, the springs 28 being weaker are thereby more readily compressed and permit the sleeve 19 to close the opening 15 before the opening 20 is closed to any appreciable extent. After the opening 15 has been closed by the sleeve 19 the steam from the exhaust pipe of the engine passes between the inner face of said sleeve 19 and the outer face on the free portion of the plug 16 and out through the opening 20, whereby a deep toned whistle is sounded. A further pull exerted on the cable 31 moves the sleeve 26 inward and reduces the size of the opening 20, thereby rendering the tone of the whistle shriller, the shrillness of said whistle varying according to the extent that the sleeve 26 is moved inward. The whistle will be sounded as long as the opening 15 remains closed, and the shrillness thereof may be increased or decreased by opening or closing said opening by the sleeve 26. When it is desired to stop the whistle the cable is released and the springs 28 and 29 expand, causing the sleeves 19 and 26 to move outward, and the sleeve 19 closes the opening 20 and uncovers the opening 15, thereby permitting the exhaust steam to pass out into the atmosphere and the whistle to remain inoperative. A chain 32 is secured to the outer closed end of the tube 1 and is designed to support the whistle from any suitable part of the vehicle to which it is applied.

The body of the plug 16 is rounded at one side and the inclined or beveled face 17 thereof is arranged opposite said rounded portion and terminates at its upper end in a cylindrical portion 18 which is disposed between the openings 15 and 20. The cylindrical upper portion of the plug is concentric with the tube 1 and its exposed portion 16$^c$ is spaced from the inner face of the sleeve 19 about the thickness of the wall of the tube 1, leaving an arc-shaped slot 16$^d$ for the passage of the steam or other actuating fluid when said sleeve 19 is moved inward to sound the whistle.

While I have illustrated the device as made of tubular members of cylindrical shape, it will be understood that they may be square, polygonal or of other cross sectional shape. It will also be noted that various changes in the proportion and arrangement of parts and in the details of construction may be resorted to within the spirit and scope of my invention.

I claim as my invention:

1. A whistle comprising a tubular member having longitudinally spaced openings in one side wall, a transverse partition in said tube between said openings, sleeves slidable on said tube and normally held yieldably in spaced relation, yieldable means for holding one of said sleeves normally projected to cover one of said tube openings and uncover the other, the yieldable sleeve projecting means having less resistance than the sleeve spacing means, means for moving said sleeves simultaneously in one direction against the resistance of said yieldable means whereby the normally uncovered opening is closed and the size of the other opening reduced.

2. A whistle comprising a tubular member having longitudinally spaced openings in one side wall, a transverse partition in said tube between said openings, inner and outer sleeves slidable on said tube and normally held yieldably in spaced relation, yieldable means for holding one of said sleeves normally projected to cover one of said tube openings and uncover the other, the yieldable sleeve projecting means having less resistance than the sleeve spacing means, means under the control of an operator connected with said outer sleeve for moving said sleeves inward simultaneously whereby the normally uncovered opening is closed and the size of the other opening reduced.

3. A whistle comprising a tubular member having longitudinally spaced openings in one side wall, a transverse partition in said tube between said openings, inner and outer sleeves slidable on said tube and normally held yieldably in spaced relation, yieldable means for holding one of said sleeves normally projected to cover one of said tube openings and uncover the other, the yieldable sleeve projecting means having less resistance than the sleeve spacing means, means under the control of an operator connected with said outer sleeve for moving said sleeves inwardly simultaneously whereby the normally uncovered opening is closed and the size of the other opening reduced, said operator controlled means being operable to move the outer sleeve inward after the inner sleeve has reached the limit of its inward movement whereby the size of the uncovered opening may be further reduced.

4. A whistle comprising a tubular member having longitudinally spaced openings in one side thereof, a transverse partition in said tube between said openings, a guide rod mounted on said tube, sleeves slidably mounted on said tube and having laterally projecting collars thereon for slidable engagement with said rod, a coiled spring mounted on said rod between the collars of said sleeves, another coiled spring mounted on said rod between the collars of the inner sleeve and the rod support on the tube, said last mentioned spring being of less resistance than the first mentioned spring, and means connected with the outer spring for moving both of said sleeves simultaneously inward against the tension of said springs to close one of said openings and vary the size of the other.

5. A whistle comprising a tubular member having longitudinally spaced openings in one side thereof, a transverse partition in said tube between said openings, a guide rod mounted on said tube, sleeves slidably mounted on said tube and having laterally projecting collars thereon for slidable engagement with said rod, a coiled spring mounted on said rod between the collars of said sleeves, another coiled spring mounted on said rod between the collars of the inner sleeve and the rod support on the tube, said last mentioned spring being of less resistance than the first mentioned spring, means connected with the outer sleeve for moving both of said sleeves simultaneously inward against the tension of said springs to close one of said openings and vary the size of the other, and a cushioning spring arranged on said rod between the collar of the outer sleeve and the rod support on the tube.

6. A whistle comprising a tubular member having longitudinally spaced openings in one side wall, a plug arranged in said tube between said openings with its outer end conforming in shape to the cross sectional shape of said tube, sleeves slidably mounted on said tube, the projecting portion of said plug being spaced from the inner wall of the sleeve which operates over it a distance equal to the thickness of the tube, yieldable means for holding said sleeves normally spaced apart, yieldable means for holding the inner sleeve normally projected to cover one of said tube openings and uncover the other, the yieldable sleeve projecting means having less resistance than the sleeve spacing means, and means for moving said sleeves simultaneously inward against the resistance of said yieldable means whereby the normally uncovered opening is closed and the size of the other opening reduced.

7. A whistle comprising a tubular member closed at one end, said tube having longitudinally spaced openings in one side wall thereof, a sleeve slidable on said tube for alternately uncovering one of said openings and closing the other, and means operable in connection with said sliding sleeve for varying the size of one of said openings when uncovered.

In testimony whereof I have hereunto set my hand in presence of two subscribing witnesses.

HORACE ELLISON.

Witnesses:
L. O. HILTON,
G. W. MUDD.

Copies of this patent may be obtained for five cents each, by addressing the "Commissioner of Patents, Washington, D. C."